(12) United States Patent
Lewis et al.

(10) Patent No.: US 10,086,715 B2
(45) Date of Patent: Oct. 2, 2018

(54) EV WIRELESS CHARGING ADJUSTABLE FLUX ANGLE CHARGER

(71) Applicants: Hyundai America Technical Center, Inc, Superior Township, MI (US); Hyundai Motor Company, Seoul (KR); Kia Motors Corporation, Seoul (KR)

(72) Inventors: Allan Lewis, Windsor (CA); Bilal Javaid, Ada, MI (US); John Robb, Oxford, MI (US); Mohammad Naserian, Windsor (CA)

(73) Assignees: Hyundai America Technical Center, Inc., Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 345 days.

(21) Appl. No.: 15/091,208

(22) Filed: Apr. 5, 2016

(65) Prior Publication Data

US 2017/0282732 A1 Oct. 5, 2017

(51) Int. Cl.
*H02J 7/00* (2006.01)
*B60L 11/18* (2006.01)
(Continued)

(52) U.S. Cl.
CPC ......... *B60L 11/1829* (2013.01); *B60L 11/182* (2013.01); *H01F 38/14* (2013.01);
(Continued)

(58) Field of Classification Search
USPC ....................................................... 320/108
See application file for complete search history.

(56) References Cited

U.S. PATENT DOCUMENTS

| 8,338,990 B2 | 12/2012 | Baarman et al. |
| 2010/0259217 A1 | 10/2010 | Baarman et al. |

(Continued)

FOREIGN PATENT DOCUMENTS

| EP | 2450920 A1 | 5/2012 |
| JP | 2010-252497 | 11/2010 |

(Continued)

OTHER PUBLICATIONS

Budhia, "Development of a Single-Sided Flux Magnetic Coupler for Electric Vehicle IPT Charging Systems", IEEE.org, vol. 60 Issue 1.

(Continued)

*Primary Examiner* — Eric Lee
(74) *Attorney, Agent, or Firm* — Mintz Levin Cohn Ferris Glovsky and Popeo, P.C.; Peter F. Corless

(57) ABSTRACT

A method includes detecting that a wireless charging-capable vehicle is in a charging position proximate a primary coil of a wireless charging system that is operable to wirelessly charge the vehicle via a secondary coil installed in the vehicle. The primary coil includes a top coil and a bottom coil that are substantially parallel to one another, the top coil and the bottom coil coupled to one another via a plurality of cross-coil junction units each including a switching element that routes electric current through at least a portion of one or more of the top coil and the bottom coil. The method further includes setting the switching elements such that current flowing through the primary coil produces an optimal angle of magnetic flux for wirelessly charging the vehicle given a position of the primary coil with respect to a position of the secondary coil, and causing electric current to flow through the primary coil according to the set switching elements to wirelessly charge the vehicle.

20 Claims, 18 Drawing Sheets

(51) Int. Cl.
*H01F 38/14* (2006.01)
*H02J 50/10* (2016.01)
*H02J 50/90* (2016.01)
*H02J 7/02* (2016.01)

(52) U.S. Cl.
CPC .............. *H02J 50/10* (2016.02); *H02J 50/90* (2016.02); *H02J 7/025* (2013.01)

(56) References Cited

U.S. PATENT DOCUMENTS

| | | |
|---|---|---|
| 2011/0074349 A1 | 3/2011 | Ghovanloo |
| 2011/0281535 A1 | 11/2011 | Low et al. |
| 2015/0279557 A1* | 10/2015 | Chiyo .................... H01F 38/14 307/104 |
| 2015/0371771 A1 | 12/2015 | Abu Qahouq |

FOREIGN PATENT DOCUMENTS

| | | |
|---|---|---|
| JP | 4947241 B2 | 6/2012 |
| WO | 2015/043250 A1 | 4/2015 |

OTHER PUBLICATIONS

Jow et al., "Geometrical Design of a Scalable Overlapping Planar Spiral Coil Array to Generate a Homogeneous Magnetic Field", IEEE Trans Magn. Dec. 21, 2012; 49(6): 2933-2945.
European Search Report for European Patent Application No. 16180267.3, dated Apr. 25, 2017, 8 pages.

* cited by examiner

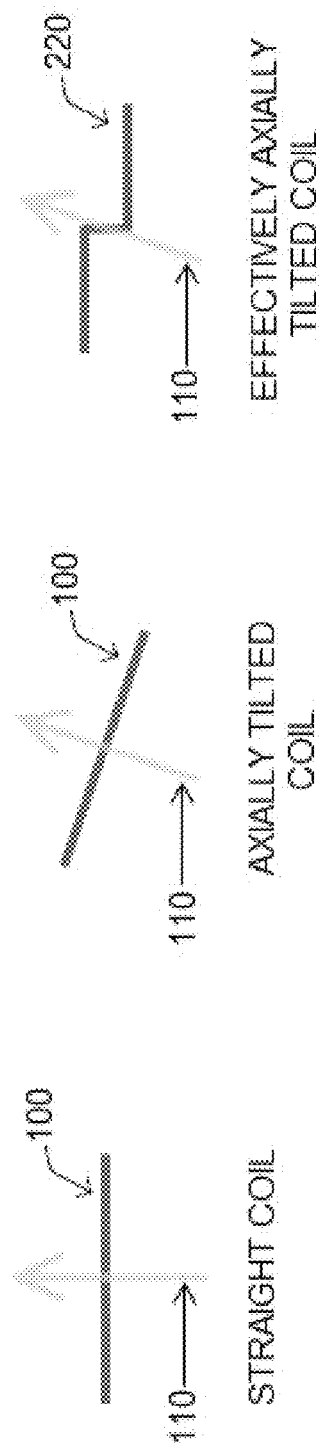

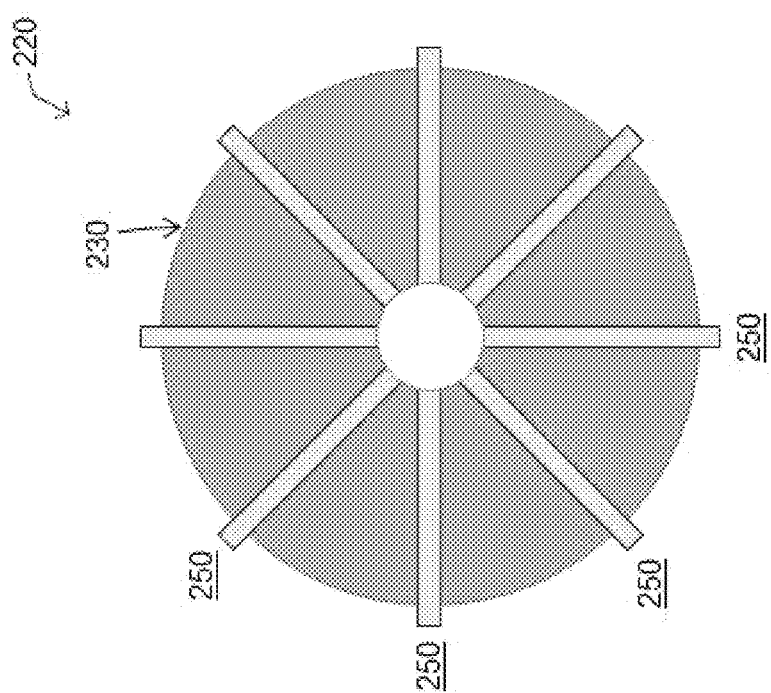

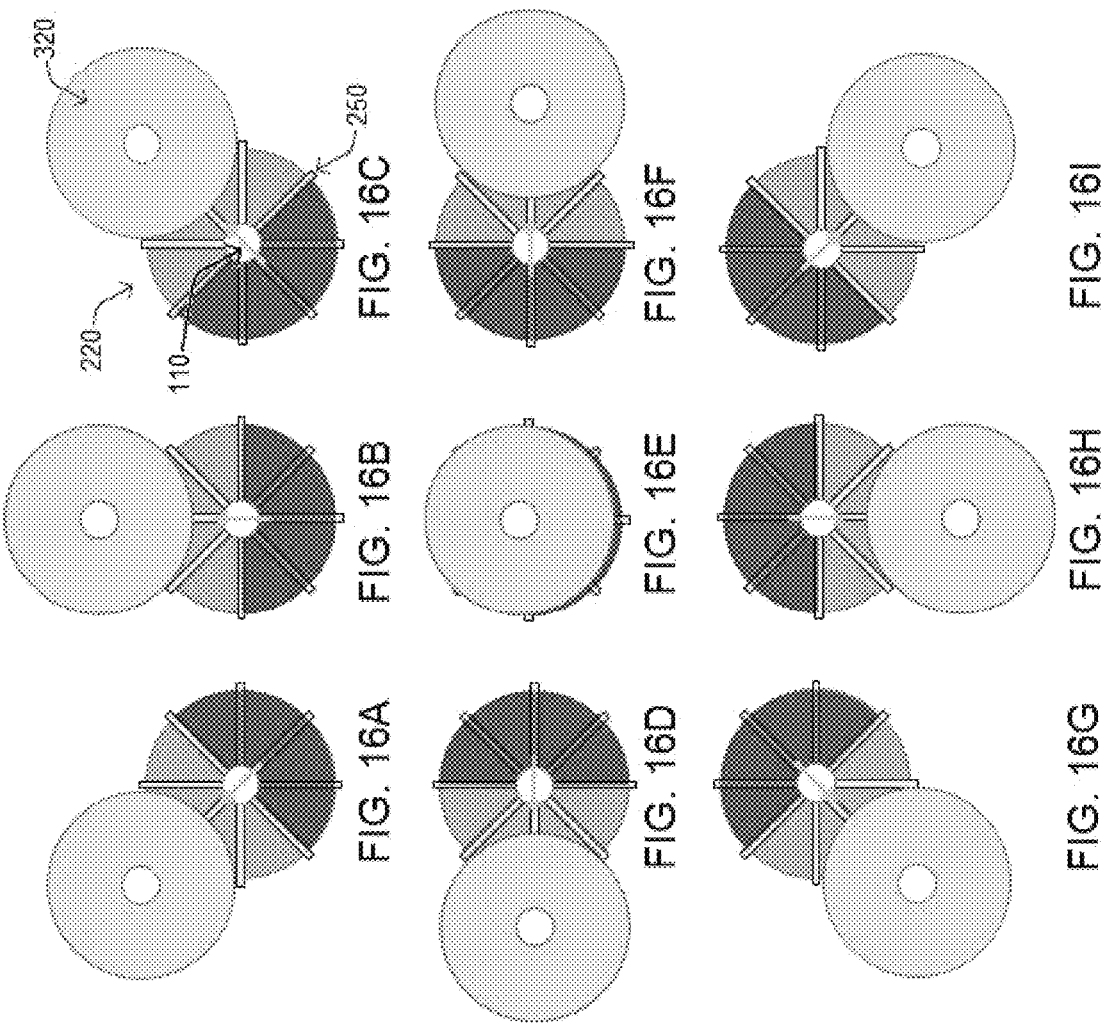

EV WIRELESS CHARGING ADJUSTABLE FLUX ANGLE CHARGER

BACKGROUND

(a) Technical Field

The present disclosure relates generally to wirelessly charging electric or hybrid electric vehicles, and more particularly, to a wireless charging system for electric vehicle with an adjustable flux angle.

(b) Background Art

Recently, technology relating to electric vehicles (EVs) and hybrid electric vehicles (HEVs) has been rapidly developing. EVs and HEVs are powered, at least in part, by electricity, and these vehicles often collect and store electricity, or in other words, are charged, from off-vehicle sources. As such, various methods of charging EVs and HEVs have been explored. In particular, techniques for wireless charging, or inductive charging, have been the subject of considerable research.

Wireless charging, as opposed to wired charging, improves durability and longevity of the charging components by limiting contact and exposure of the components, increases safety by concealing potentially dangerous wires and connection interfaces, and enhances versatility by allowing charging stations to be implemented in a variety of ways (e.g., as a portable charging pad, embedded in a parking lot or road, etc.). To these ends, wireless charging relies on an electromagnetic field to transfer energy between a charging station (e.g., wireless charging assembly) and an electrical device, such as a smart phone, a laptop, or an electric vehicle, as in the present case. Energy is sent through an inductive coupling formed between the wireless charging assembly and the device. Typically, an induction coil in the wireless charging assembly (i.e., primary coil) uses electricity, often provided from the power grid, to create an alternating electromagnetic field. Parameters of the coil design include the radius, shape, number of turns, and spacing between turns, which are designed for the specific application. An induction coil in the electrical device (i.e., secondary coil) may then receive power from the generated electromagnetic field and convert it back into electrical current to charge its battery. As a result, the primary and secondary induction coils combine to form an electrical transformer, whereby energy can be transferred between the two coils through electromagnetic induction.

Notably, efficient power transfer between the primary and secondary coils depends on proper alignment between the two coils. However, when the primary coil is laterally offset from the secondary coil, misalignment occurs. Misalignment results in a loss of power transfer efficiency because the incident magnetic flux on the secondary coil is not at the optimal angle. For illustration, FIG. 1 shows an example primary coil conventionally used for wireless power transfer. The primary coil 100 includes multiple turns and allows for current to flow therethrough. Current flowing through the coil 100 creates an electromagnetic field with a magnetic flux 110. A basic primary coil configuration, such as primary coil 100, results in a magnetic flux direction which is straight upwards, as shown in FIG. 1.

However, the angle of the resultant magnetic flux 110 will not allow for optimal power transfer unless a secondary coil is positioned directly above the primary coil 100. As an example, in the case of wirelessly charging an electric vehicle using a charging pad positioned on the ground, or a charging system embedded in the ground, if the vehicle is not properly parked over the charger, the secondary coil installed in the vehicle will be misaligned with the primary coil transferring energy. Therefore, the electric vehicle charge process will be less efficient. While a slight misalignment can decrease charging efficiency, causing wireless charging to take longer than normal, a larger misalignment can prevent wireless charging entirely.

SUMMARY OF THE DISCLOSURE

The present disclosure provides techniques for utilizing a power transmitter coil (i.e., primary coil) assembly including at least two parallel coils, each coil separated by a distance z with electrical switching elements between them. The switching elements, located in cross-coil junction units which couple the parallel coils to one another, can be controlled to guide electric current through specific parts of the coils and effectively create different current flow configurations. Each current flow configuration produces a unique angle of magnetic flux. Therefore, an optimal current flow configuration can be selected for producing an angle of magnetic flux that maximizes the wireless charging efficiency, particularly when charging electric (or hybrid electric) vehicles. Use of techniques described herein result in greater misalignment tolerance. This allows drivers of electric vehicles to worry less about parking exactly over the primary coil in order for charging to work. Additionally, these techniques create better power transfer efficiency when the coils are misaligned. Thus, vehicles can be charged over a larger span of distance, which is particularly beneficial in dynamic charging scenarios.

According to embodiments of the present disclosure, a method includes detecting that a wireless charging-capable vehicle is in a charging position proximate a primary coil of a wireless charging system that is operable to wirelessly charge the vehicle via a secondary coil installed in the vehicle. The primary coil includes a top coil and a bottom coil that are substantially parallel to one another, the top coil and the bottom coil coupled to one another via a plurality of cross-coil junction units each including a switching element that routes electric current through at least a portion of one or more of the top coil and the bottom coil. The method further includes: setting the switching elements such that current flowing through the primary coil produces an optimal angle of magnetic flux for wirelessly charging the vehicle given a position of the primary coil with respect to a position of the secondary coil; and causing electric current to flow through the primary coil according to the set switching elements to wirelessly charge the vehicle.

The method may further include: cycling through a plurality of current flow configurations in the primary coil by adjusting states of the switching elements; determining which current flow configuration of the plurality of current flow configurations produces the optimal angle of magnetic flux for wirelessly charging the vehicle; and setting the switching elements according to the determined current flow configuration. In this regard, the method may further include: receiving charging efficiency data from the vehicle during the cycling through of the plurality of current flow configurations; and determining which current flow configuration of the plurality of current flow configurations produces the optimal angle of magnetic flux for wirelessly charging the vehicle based on the charging efficiency data. Additionally, the method may further include: causing low-power electric current to flow through the primary coil during the cycling through of the plurality of current flow configurations; and causing full-power electric current to flow through the primary coil after the setting of the switching elements according to the determined current flow configuration to wirelessly charge the vehicle. Each current flow configuration of the plurality of current flow configurations may produce a unique angle of magnetic flux for wirelessly charging the vehicle.

The optimal angle of magnetic flux for wirelessly charging the vehicle may be an angle offset from a vertical axis extending upwardly from the primary coil when the vehicle is positioned such that the secondary coil is misaligned with the primary coil. Also, the current flowing through the primary coil may produce an angle of magnetic flux for wirelessly charging the vehicle that is proportional to a ratio of z/R, where z is a vertical distance between the top coil and the bottom coil, and R is an average coil radius of the primary coil.

The plurality of cross-coil junction units may be disposed between the top coil and the bottom coil. One end of each cross-coil junction unit may be connected to the top coil, while another end of each cross-coil junction unit may be connected to the bottom coil.

The plurality of cross-coil junction units may be disposed along one line traversing a diameter of the top coil and the bottom coil. Alternatively, the plurality of cross-coil junction units may be disposed along multiple lines traversing a diameter of the top coil and the bottom coil. In this case, each line of cross-coil junction units may be angularly offset from an adjacent line of cross-coil junction units by 45 degrees.

Furthermore, two cross-coil junction units may be disposed in the primary coil for every full turn of the top coil or the bottom coil. In such case, the method may further include: controlling the switching element of a first cross-coil junction unit of the two cross-coil junction units using a first control signal; and controlling the switching element of a second cross-coil junction unit of the two cross-coil junction units using a second control signal.

The electric current may flow through the top coil only when the switching elements are in a default state, thus producing an angle of magnetic flux for wirelessly charging the vehicle that is parallel to a vertical axis extending upwardly from the primary coil.

In addition, the primary coil may further include a first intermediate coil and a second intermediate coil that are disposed between the top coil and the bottom coil and substantially parallel to the top coil and the bottom coil, and the switching elements included in the plurality of cross-coil junction units may route electric current through at least a portion of one or more of the top coil, the bottom coil, the first intermediate coil, and the second intermediate coil.

Also, each switching element may include a single-pole double-throw (SPDT) switch, dual relays, or a group of four metal-oxide-semiconductor field-effect transistors (MOSFETs).

Furthermore, according to embodiments of the present disclosure, a wireless charging system includes: a primary coil that is operable to wirelessly charge a wireless charging-capable vehicle via a secondary coil installed in the vehicle, the primary coil including a top coil and a bottom coil that are substantially parallel to one another, the top coil and the bottom coil coupled to one another via a plurality of cross-coil junction units each including a switching element that routes electric current through at least a portion of one or more of the top coil and the bottom coil; a circuit that drives the primary coil and causes electric current to flow through the primary coil; and a wireless charging controller configured to: detect that the vehicle is in a charging position proximate the primary coil, set the switching elements such that current flowing through the primary coil produces an optimal angle of magnetic flux for wirelessly charging the vehicle given a position of the primary coil with respect to a position of the secondary coil, and control the circuit such that electric current is caused to flow through the primary coil according to the set switching elements to wirelessly charge the vehicle.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6C illustrate example simplified side views of current flowing through a power transmitting coil and the resultant magnetic flux;

FIG. 15 illustrates an example simplified top view of the primary coil and an alternate arrangement of cross-coil junction units;

FIGS. 16A-16I illustrate example simplified top views of a primary coil having multiple rows of cross-coil junction units in varying degrees of misalignment with a secondary coil;

Figure 1:
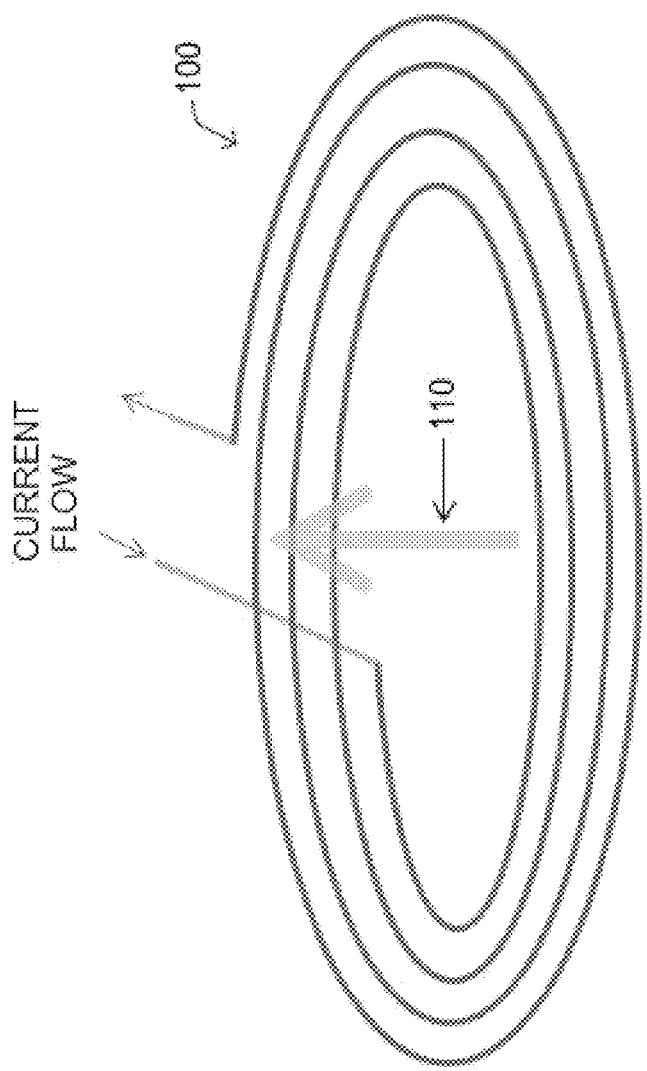
FIG. 1 illustrates an example primary coil conventionally used for wireless power transfer.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Wireless charging, wirelessly transferring power, or the like, may refer to transferring any form of energy associated with electric fields, magnetic fields, electromagnetic fields, or otherwise from a transmitter to a receiver without the use of physical electrical conductors (e.g., power may be transferred through free space). The power output from a first (e.g., "primary") coil into a wireless field (e.g., a magnetic field) may be received or captured by a second (e.g., "secondary" or "receiving") coil to achieve power transfer.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The terms "controller" and "wireless charging controller" may be used herein interchangeably. Moreover, it is understood that the below methods may be executed by a wireless charging system comprising the controller, as described in detail below.

Referring now to embodiments of the present disclosure, the disclosed techniques allow for utilizing a power transmitter coil (i.e., primary coil) assembly including at least two parallel coils, each coil separated by a distance z with electrical switching elements between them. The switching elements, located in cross-coil junction units which couple the parallel coils to one another, can be controlled to guide electric current through specific parts of the coils and effectively create different current flow configurations. Each current flow configuration produces a unique angle of magnetic flux. Therefore, the efficiency of wireless charging systems can be improved by adjusting the magnetic flux angle to optimally couple with a power receiving coil (i.e., secondary coil) installed in the vehicle to be charged. Further, adjustment of the magnetic flux angle can be achieved without any physically moving parts (e.g., mechanically tilting coils), along with greater misalignment tolerance and the capability to charge a vehicle over a larger span of distance result.

Figure 2:
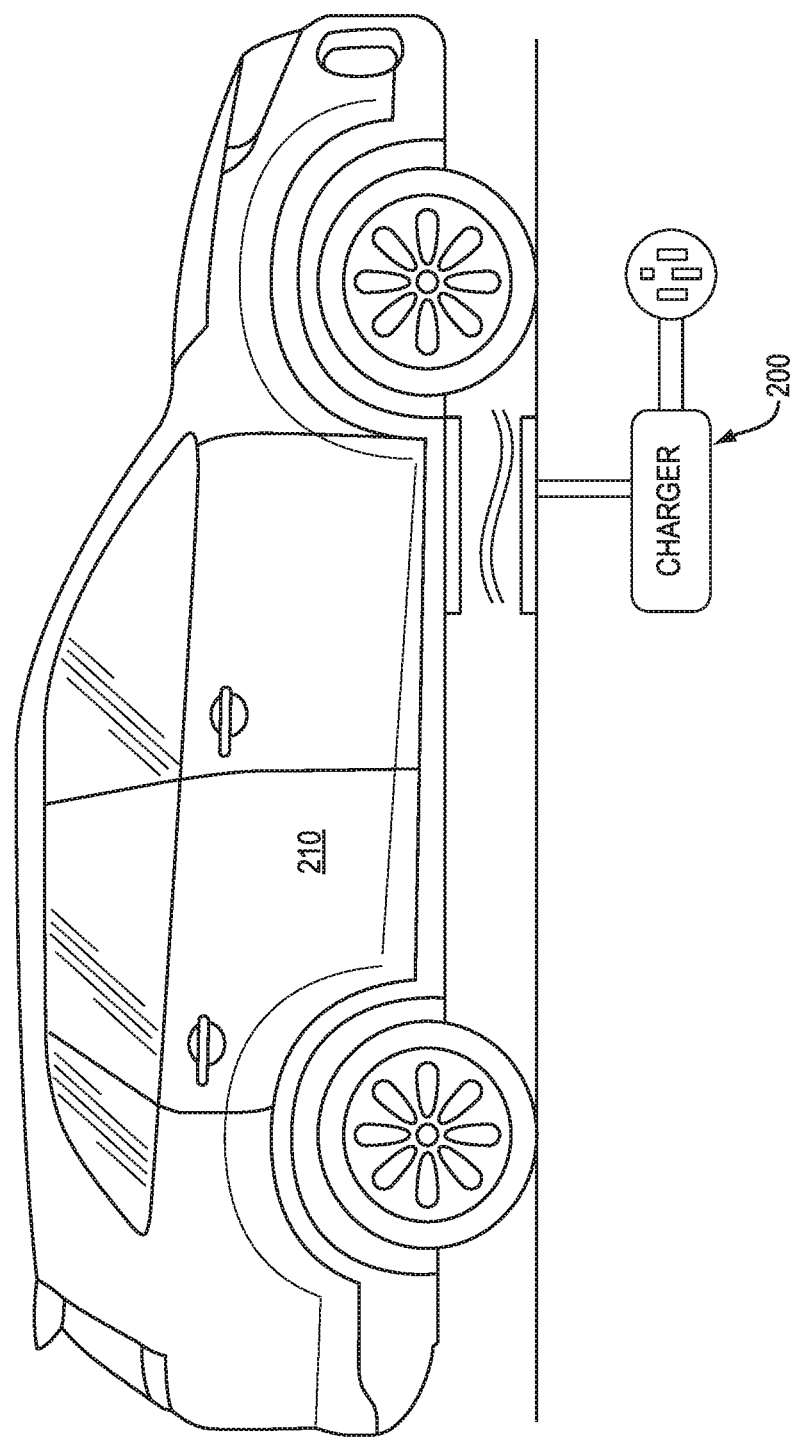
FIG. 2 illustrates an example depiction of a wireless charging-capable vehicle in a charging position proximate a wireless charging system.

FIG. 2 illustrates an example depiction of a wireless charging-capable vehicle in a charging position proximate a wireless charging system. As shown in FIG. 2, a vehicle 210 may be an EV, HEV, or the like, that is capable of being wirelessly charged. An inductive coil (i.e., secondary coil) may be installed in the vehicle 210 for receiving energy wirelessly transmitted from an inductive coil of a wireless charging system (via an electromagnetic field generated through an inductive coupling between the coils). The secondary coil is typically connected to an impedance matching circuit, a rectifier, and then a load. The vehicle 210 may be aligned with the wireless charging system 200, as shown in FIG. 2, in order to wirelessly receive energy from the charging system 200 (the process of which being described hereinabove).

The wireless charging system 200 may embody a primary coil including one or more induction coils that uses electricity to create an electromagnetic field and, consequently, wirelessly charge the nearby vehicle 210. The wireless charging system 200 may be connected to and receive electric current from a local power distribution center (e.g., power grid), or any other suitable energy source. The wireless charging system 200 may be positioned in any suitable area (e.g., a parking spot in a parking lot, a garage, roadway, etc.) and implemented in any suitable manner, such as a portable charging pad or embedded in or under the ground (either partially or entirely). Or, the wireless charging system 200 may consist of an array of primary coils embedded in or under the ground for dynamic charging purposes. In any event, the wireless charging system 200 is positioned and implemented such that the vehicle 210 can be driven and/or parked in a charging position sufficiently proximate to the wireless charging system 200, allowing the vehicle 210 to wirelessly receive electricity transferred from the charging system 200.

Figure 3:
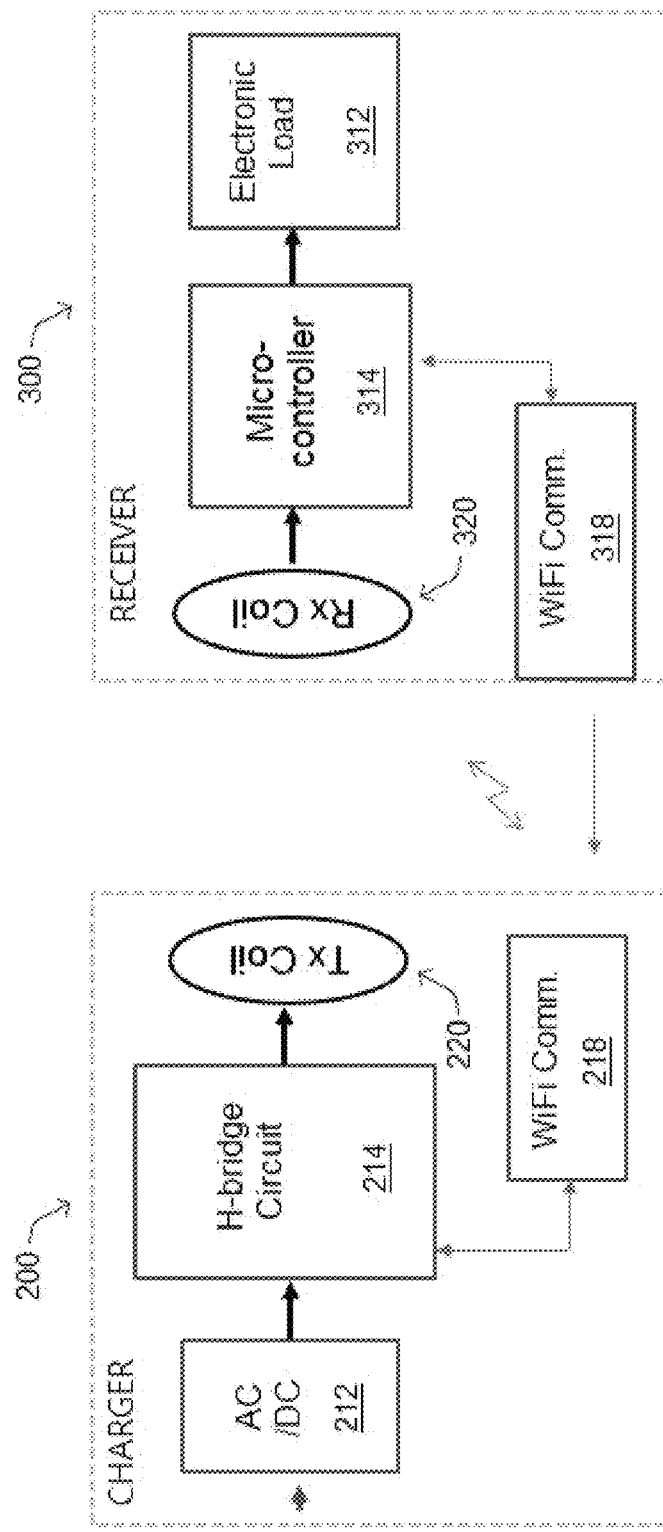
FIG. 3 illustrates an example architectural diagram of a wireless charger and receiver.

In greater detail, FIG. 3 illustrates an example architectural diagram of a wireless charger and receiver. As shown in FIG. 3, the charging system 200 can wirelessly communicate with and transfer energy to the receiver 300. The wireless charging system 200 may include, for example, an AC/DC front end 212, an H-bridge circuit 214, primary coil 220 ("Tx Coil"), and wireless communication means 218 ("WiFi Comm") The wireless receiver 300 may include an electronic load 312, microcontroller 314, secondary coil 320 ("Rx Coil"), and wireless communication means 318 ("WiFi Comm") It should be understood that the configurations of the wireless charging system 200 and receiver 300 shown in FIG. 3 are for demonstration purposes only and should not be treated as limiting the same to the depicted configuration. Rather, the wireless charging system 200 and wireless receiver 300 may be configured in any suitable manner in accordance with the scope of the present claims.

In the wireless receiver 300, which may be embodied in an electric, hybrid electric, or otherwise wireless charging-capable vehicle, e.g., vehicle 210, the secondary coil 320 may have a voltage induced by the magnetic field generated by electric current flowing through the primary coil 220. Wireless power transfer can generally occur between 80 kHz-90 kHz. The microcontroller 314 may control the operation of the receiver 300. The microcontroller 314 may include a rectifier (not shown), e.g., for converting the AC into DC in order to charge the electronic load 312 (e.g., battery), and/or a filter (not shown), e.g., for filtering the received electric current. Upon establishment of wireless communications between the wireless communication means 218 and 318, transmission of information from the wireless communication means 318 to the wireless communication means 218, or vice versa, can commence. For instance, the wireless communication means 318 may wirelessly transmit information to the wireless communication means 218 to assist in selection of the optimal current flow configuration, such as charging efficiency data indicating an efficiency of the current charging process, a battery state of charge (SOC), and so forth.

In the wireless charging system 200, the AC/DC front end 212 may receive electric current from a power source (e.g., a power plant) and convert the current from alternating current (AC) into high-voltage direct current (DC). As an example, the AC/DC front end 212 may convert a 60 Hz AC into 525 V DC. The converted DC may then be outputted from the AC/DC front end 212 to the H-bridge circuit 214 which functions as an inverter. The H-bridge circuit 214 may be variously configured and may embody, for instance, a capacitor and an inductor (i.e., the primary coil 220) in series. The H-bridge circuit 214 may include drive electronics to drive the primary coil 220. The wireless charging system 200 may additionally include a controller which can adjust the switching frequency and current through the load (i.e., a capacitor and inductor). Notably, an H-bridge circuit is merely an example of the circuitry which could be implemented in the wireless charging system 200 for driving the primary coil 220.

Figure 4:
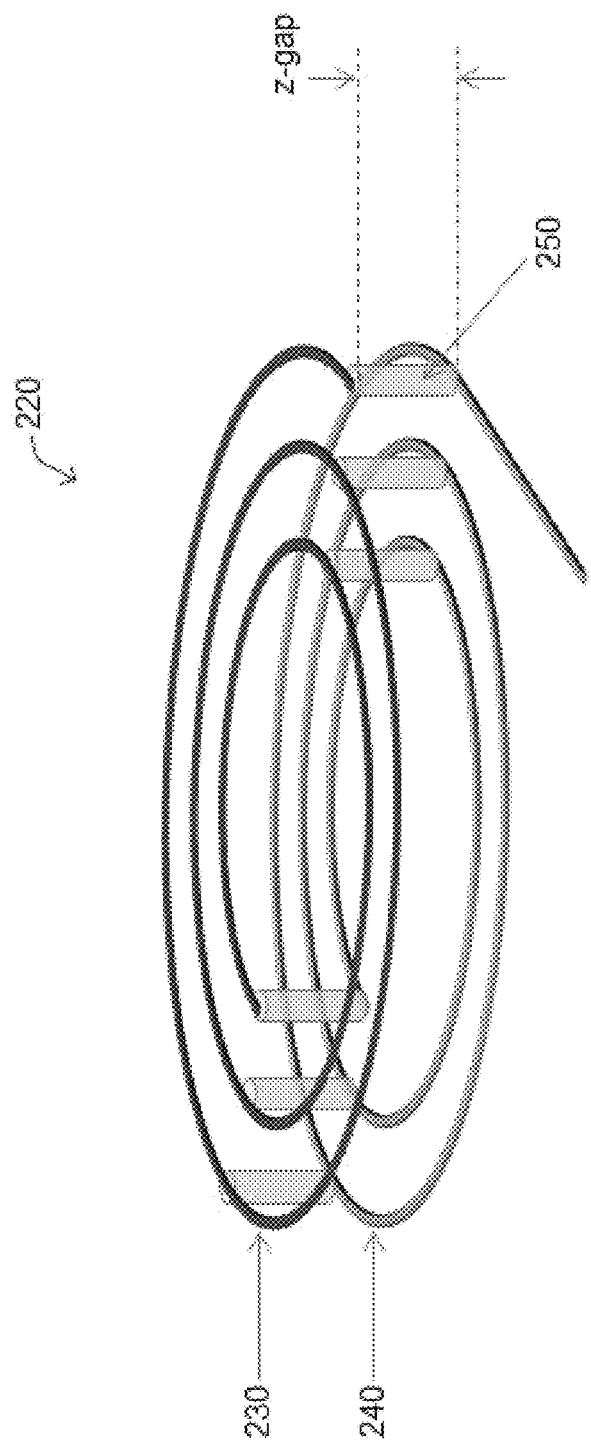
FIG. 4 illustrates an example power transmitter coil assembly according to embodiments of the present disclosure.

FIG. 4 illustrates an example power transmitter coil assembly according to embodiments of the present disclosure. As shown in FIG. 4, the primary coil 220 may feature two layers of coils: a top coil 230 and a bottom coil 240. Though FIG. 4 depicts the primary coil 220 as having two layers of coils, additional layers of coils may be added, as described further below. The top coil 230 and bottom coil 240 may be positioned such that they are substantially parallel to each other. The top coil 230 may be separated from the bottom coil 240 by a distance z, i.e., the "z-gap." Parameters for the top and bottom coils, including radius, number of turns, shape, wire material, and the like, can be variously set. However, both the top and bottom coils should have the same parameters and should be positioned so as to directly oppose each other, as shown in FIG. 4.

The top coil 230 may be coupled to the bottom coil 240 via a series of cross-coil junction units 250. The cross-coil junction units 250 may be disposed between the top coil 230 and bottom coil 240 and extend across the z-gap. One end of each cross-coil junction unit 250 may be connected to the top coil 230, and the other end of each cross-coil junction unit 250 may be connected to the bottom coil 240.

Figure 5B:
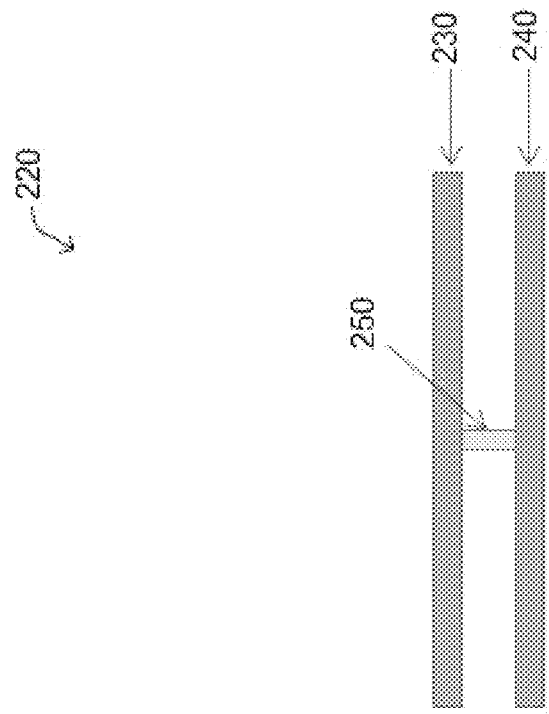
FIGS. 5A and 5B illustrate example simplified additional views of the primary coil and cross-coil junction units.
Figure 5A:
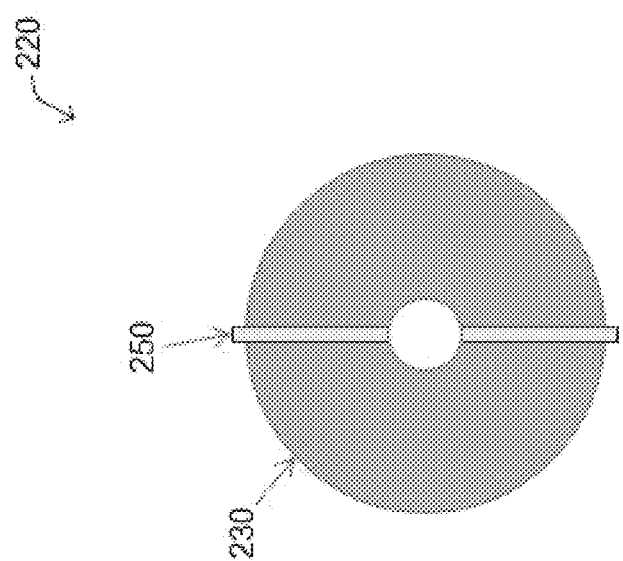

Additional views are illustrated in FIGS. 5A and 5B. FIG. 5A illustrates an example simplified top view of the primary coil and cross-coil junction units. FIG. 5B illustrates an example simplified side view of the primary coil and cross-coil junction units. As shown, the primary coil 220 may include a single row of cross-coil junction units 250. That is, the cross-coil junction units 250 may be disposed along one line traversing a diameter of the top coil 230 and the bottom coil 240. Additional rows of cross-coil junction units 250 traversing the diameter of the coils may be added, as shown in detail below.

Each cross-coil junction unit 250 may include an electrical switching element 260 that routes electric current through specific portions of the top coil 230 and/or the bottom coil 240. The switching elements 260, as described in greater detail below, can be controlled in order to route electric current through specific portions of the primary coil (e.g., the top and/or bottom coils). Two wires—control signal and ground—from the wireless charger controller may penetrate each cross-coil junction unit 250 to provide a control signal for the switching elements 260. Two different control signals may be used, as discussed further below. By routing electric current through specific portions of the coils, a plurality of different current flow configurations can be created, whereby each current flow configuration results in a unique angle magnetic flux.

As is known in the art, magnetic flux is the product of the average magnetic field times the perpendicular area that it penetrates. In the case of current flowing through a circular coil, the resulting magnetic flux direction is perpendicular to a plane in which the current flows. In this regard, FIGS. 6A-6C illustrate example simplified side views of current flowing through a power transmitting coil and the resultant magnetic flux. As shown in FIG. 6A, when a typical power transmitting coil, e.g., primary coil 100 in FIG. 1, is straight with respect to the ground, the magnetic flux 110 resulting from current flowing through the coil 100 extends perpendicularly from the plane of the coil 100 along a vertical axis extending upwardly from the ground. Similarly, as shown in FIG. 6B, when the primary coil 100 is axially tilted with respect to the ground, the magnetic flux 110 resulting from current flowing through the coil 100 extends perpendicularly from the plane of the coil 100 at an angle that is offset from the vertical axis. The angular offset of the magnetic flux from the vertical axis is equivalent to the angular offset of the coil 100 from the ground.

Meanwhile, as shown in FIG. 6C, the primary coil 220 is straight with respect to the ground, similar to the primary coil 100 in FIG. 6A. However, in accordance with embodiments of the present disclosure, the primary coil 220 includes a top coil 230 and a bottom coil 240 coupled together by cross-coil junction units 250. If switching elements 260 in the primary coil 220 assembly are set such that current flows through a section of the top coil 230 and a section of the bottom coil 240, as shown in FIG. 6C (only the sections of coil through which current flows are illustrated), the resultant magnetic flux 110 can be angularly offset from the vertical axis, similar to the magnetic flux 110 in FIG. 6B, even though the primary coil 220 is parallel to the ground. Therefore, various angles of magnetic flux 110 can be achieved using the primary coil 220 by controlling switching elements 260 to route current through specific sections of the top coil 230 and the bottom coil 240.

Figure 7:
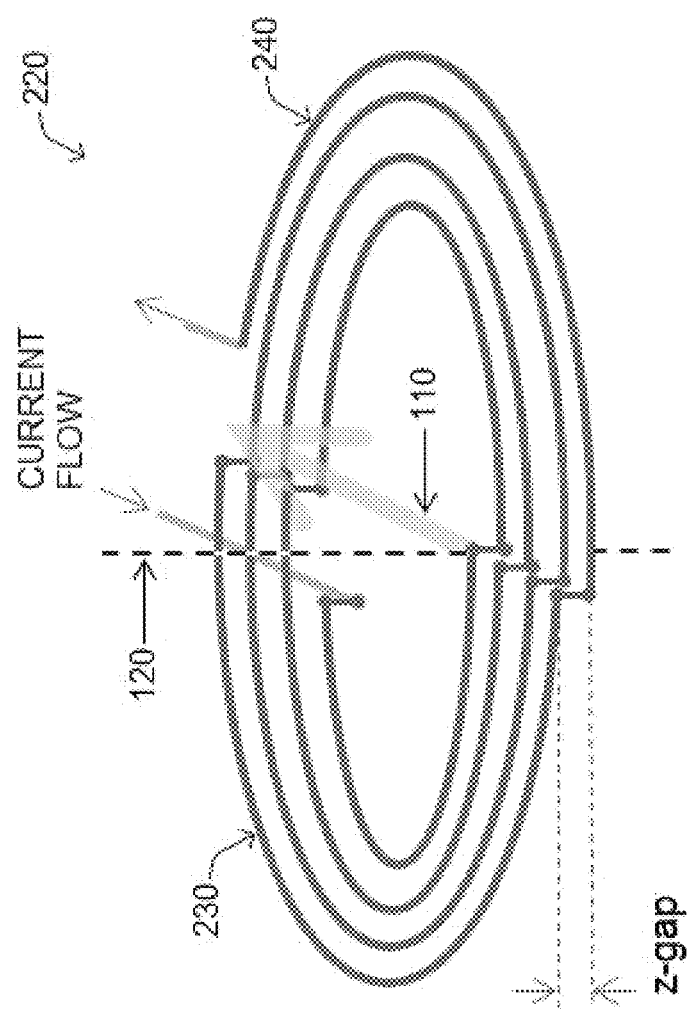
FIG. 7 illustrates an example primary coil with current flowing though sections of the top and bottom coils in accordance with embodiments of the present disclosure.

FIG. 7 illustrates an example primary coil with current flowing though sections of the top and bottom coils in accordance with embodiments of the present disclosure. As shown in FIG. 7, switching elements 260, which are described in further detail below, may be set such that current flows through a section of the top coil 230 and a section of the bottom coil 240. Note that for demonstration purposes only the sections of coil through which current flows are illustrated in FIG. 7. As a result, the angle of the resultant magnetic flux 110 is offset from a vertical axis 120 extending upwardly from the primary coil 220, in contrast to the conventional coil assembly 100 and resultant magnetic flux 110 shown in FIG. 1.

Figure 8:
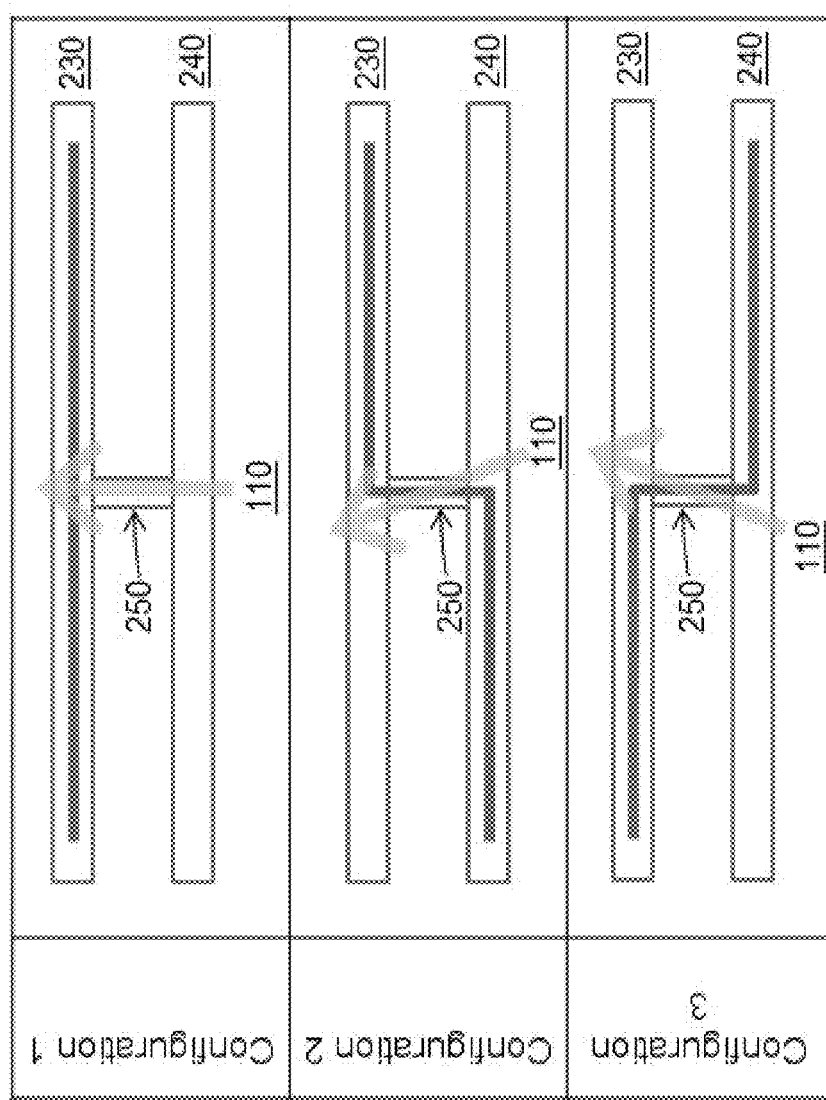
FIG. 8 illustrates a plurality of example current flow configurations for achieving varying magnetic flux angles.

Accordingly, various angles of magnetic flux 110 can be achieved using the primary coil 220 by controlling switching elements 260 to route current through specific sections of the top coil 230 and the bottom coil 240. Each current flow configuration can produce a unique angle of magnetic flux 110 for wirelessly charging a vehicle with optimal efficiency given the degree of alignment between the primary coil 220 and secondary coil 320. In this regard, FIG. 8 illustrates a plurality of example current flow configurations for achieving varying magnetic flux angles. As shown in FIG. 8, there may be three possible current flow configurations (though the present disclosure is not limited to three current flow configurations, as demonstrated below), due to the positioning of the cross-coil junction units 250—shown in FIGS. 5A and 5B—and the number of coil layers in the primary coil 220, which in this case equals two (i.e., top layer 230 and bottom layer 240). The solid line drawn through portions of the top coil 230 and/or bottom coil 240 indicates a flow of electric current.

In the first current flow configuration ("Configuration 1"), electric current only flows through the top coil 230. This may be considered a default state. To this point, the switching elements 260 in the cross-coil junction units 250 may default to passing current through the top coil 230, thereby producing a magnetic flux 110 parallel to the vertical axis 120 extending from the primary coil 220. Thus, computations can be minimized when a driver of the vehicle to be charged (e.g., vehicle 210) parks such that the secondary coil 320 in the vehicle is properly aligned with the primary coil 220 in the wireless charging system. That is, in such case, the primary coil 220 can be driven without adjusting any states of the switching elements 260, as the switching elements 260 can default to routing electric current through the top coil 230. This configuration is effectively equivalent to the conventional primary coil 100 and resultant magnetic flux 110 shown in FIG. 1.

In the second current flow configuration ("Configuration 2"), electric current flows through a section of the top coil 230 and a section of the bottom coil 240. Specifically, from the perspective shown in FIG. 8, electric current flows through a left section of the bottom coil 240 and a right section of the top coil 230. This flow configuration results in a magnetic flux 110 angle that is offset to the left of the vertical axis 120. Of course, the terms "left" and "right" are used herein merely for the purpose of simplification, as the directivity of the coils will change based on the viewer's position with respect to the coils.

In the third current flow configuration ("Configuration 3"), electric current flows through a section of the top coil 230 and a section of the bottom coil 240. Specifically, from the perspective shown in FIG. 8, electric current flows through a left section of the top coil 230 and a right section of the bottom coil 240. This flow configuration results in a magnetic flux 110 angle that is offset to the right of the vertical axis 120 extending from the primary coil 220.

Notably, the angle of the magnetic flux 110 in the second and third current flow configurations relative to the directly vertical magnetic flux in the first current flow configuration is proportional to the ratio z/R, where z is the vertical distance between the top and bottom coils, and R is the average coil radius. Thus, the angular offset (ϕ) of the magnetic flux 110 with respect to the vertical axis 120 may vary, as follows:

$$\phi \propto z/R \quad \text{[Equation 1]}$$

According to Equation 1, the angular offset (ϕ) of the magnetic flux 110 increases as the distance between the top and bottom coils increases and decreases as the average radius of the top and bottom coils increases.

Figure 9:
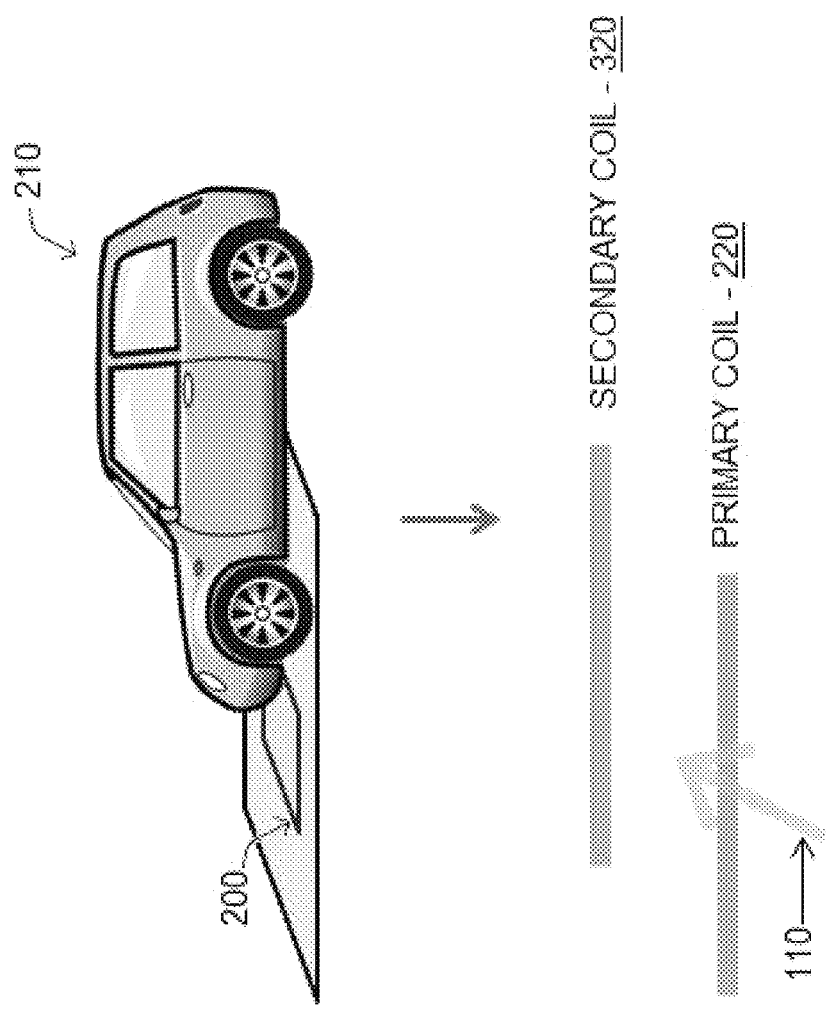
FIG. 9 illustrates an example scenario for selecting an optimal magnetic flux angle based on a misalignment between the primary and secondary coils.

FIG. 9 illustrates an example scenario for selecting an optimal magnetic flux angle based on a misalignment between the primary and secondary coils. As shown in FIG. 9, a driver of a wireless charging-capable vehicle 210 (e.g., electric vehicle, hybrid electric vehicle, etc.) may drive to a wireless charging system 200 in order to wirelessly charge the vehicle 210. The wireless charging system 200 may detect that the vehicle 210 is in a charging position proximate the primary coil 220. Or, the wireless charging system 200 may receive a charging request from the vehicle 210. Then, based on the degree of alignment (or misalignment) between the secondary coil 320 of the vehicle 210 and the primary coil 220 of the wireless charging system 200, the wireless charging controller can automatically set the switching elements 260 such that current flowing through the primary coil 220 produces an optimal angle of magnetic flux 110 for wirelessly charging the vehicle 210 given a position of the primary coil 220 with respect to a position of the secondary coil 320. Upon setting the switching elements 260, the controller can cause electric current to flow through the primary coil 220 according to the set switching elements 260 to wirelessly charge the vehicle 210.

For instance, in the scenario depicted in FIG. 9, the vehicle 210 is located in a charging position proximate to the wireless charging system 200. However, the secondary coil 320 and the primary coil 220 are not properly aligned. Thus, a conventional primary coil 100 producing a vertical magnetic flux 110, as shown in FIG. 1, cannot efficiently transfer power to the secondary coil 320 in this case. Instead, an angled magnetic flux 110 that is directed toward the secondary coil 320 is needed in order to achieve maximum charging efficiency.

In this case, a current flow configuration that produces an optimal magnetic flux 110 for wirelessly charging the vehicle 210 can be determined by the wireless charging controller. Here, the third current flow configuration as shown in FIG. 8 can be selected, as the magnetic flux 110 resulting from electric current flowing through the primary coil 220 in the third current flow configuration is offset from the vertical axis 120 and directed toward the secondary coil 320. That is, the resultant magnetic flux 110 is optimal for wirelessly charging the vehicle 210 given a position of the primary coil 220 with respect to a position of the secondary coil 320, as compared to the other current flow configurations.

When determining which current flow configuration of the plurality of current flow configurations produces the optimal angle of magnetic flux 110 for wirelessly charging the vehicle 210, the wireless charging controller may cycle through the plurality of current flow configurations by adjusting states of the switching elements 260. When cycling through the current flow configurations, the controller can cause a low-power electric current to flow through the primary coil 220. Full-power electric current is not necessary at this stage, as the wireless charging system 200 is not yet charging the vehicle 210, but rather testing the various configurations.

Meanwhile, the controller may receive charging efficiency data from the vehicle 210 during or after the cycling through of the plurality of current flow configurations. For instance, the wireless communication means 318 in the receiver 300 can transmit the charging efficiency data to the wireless communication means 218 of the wireless charging system 200. Then, the controller can determine which current flow configuration produces the optimal angle of magnetic flux 110 for wirelessly charging the vehicle 210 based on the received charging efficiency data (e.g., by comparing the charging efficiency data corresponding to each current flow configuration).

Upon determining the current flow configuration that produces the optimal magnetic flux 110, the appropriate switching elements 260 can be set in order to achieve the desired current flow and resultant magnetic flux 110, and the controller can cause electric current to flow through the primary coil 220 according to the set switching elements 260 to wirelessly charge the vehicle 210. The current flowing through the primary coil 220 to wirelessly charge the vehicle 210 can be a full-power electric current, as opposed to the lower-power electric current used to test the charging efficiencies of the current flow configurations during the cycling step.

Figure 10:
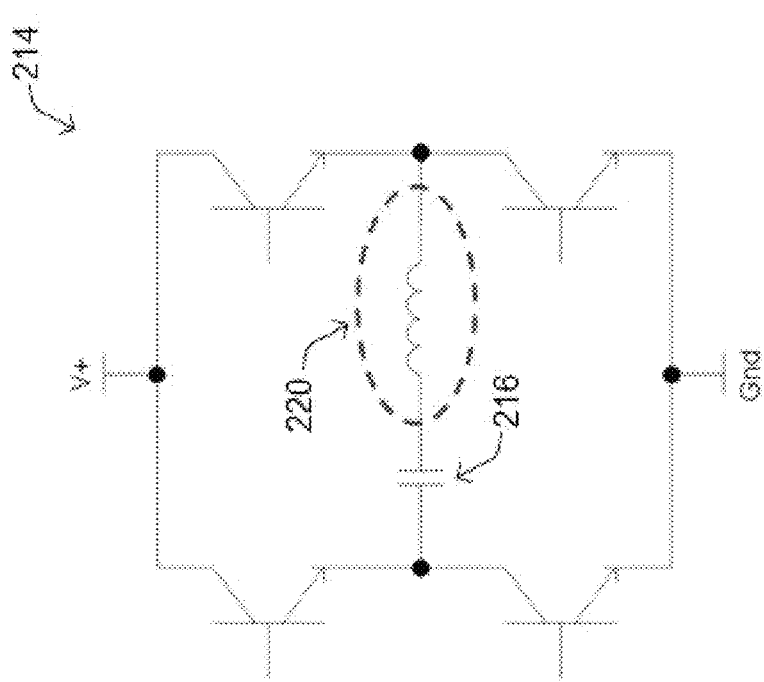
FIG. 10 illustrates an example circuit diagram for driving the primary coil.

FIG. 10 illustrates an example circuit diagram for driving the primary coil. As shown in FIG. 10, a circuit 214, such as an H-bridge circuit (see FIG. 3), may be used to drive the primary coil 220. In this respect, the circuit 214 may function as an inverter. The circuit 214 may include a load consisting of a capacitor 216 and an inductor 220 connected in series. The inductor 220 may be the primary coil 220 and is depicted in greater detail in FIG. 11. The V+ source may be DC voltage from the AC/DC head 212. In addition, field effect transistors (FETs) in the circuit 214 may be controlled by the controller (not shown) which can adjust the switching frequency and current through the load.

Figure 11:
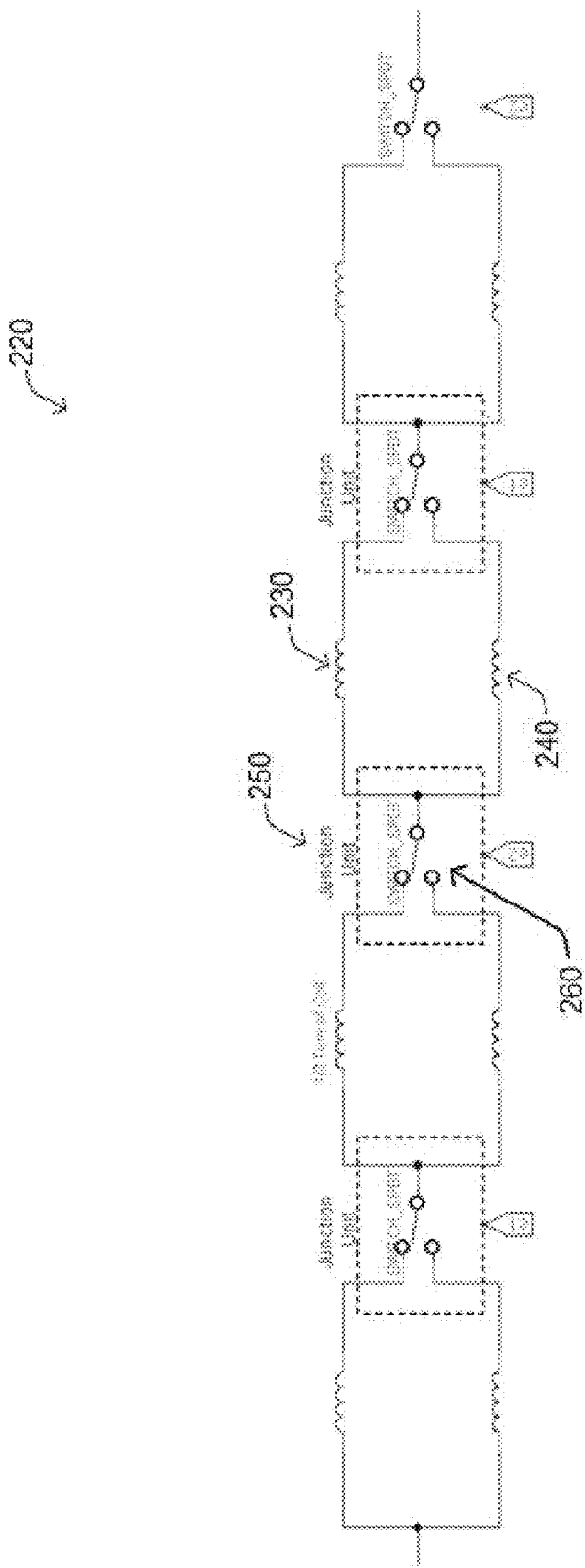
FIG. 11 illustrates an example circuit diagram of the primary coil.

In further detail, FIG. 11 illustrates an example circuit diagram of the primary coil. As shown in FIG. 11, the inductor 220 (or primary coil 220) may include a cross-coil junction unit 250 for every half turn of the coil. A switching element 260 may be included in every junction unit 250 for routing electric current through the primary coil 220. Though the switching elements 260 illustrated in FIG. 11 include a single-pole double-throw (SPDT) switch, the switching elements 260 may alternatively or additionally include, for example, relays and/or metal-oxide-semiconductor field-effect transistors (MOSFETs). The wireless charging controller can control the switching elements 260 using at least one control signal. For example, the controller may use two control signals—c1 and c2—to control states of the switching elements 260, as shown in FIG. 11. Because two cross-coil junction units 250 may be disposed in the primary coil 220 for every full coil turn, a first control signal (e.g., c1) may be used to control the switching element 260 of the first of the two cross-coil junction units 250, while a second control signal (e.g., c2) may be used to control the switching element 260 of the second of the two cross-coil junction units 250.

Figure 12:
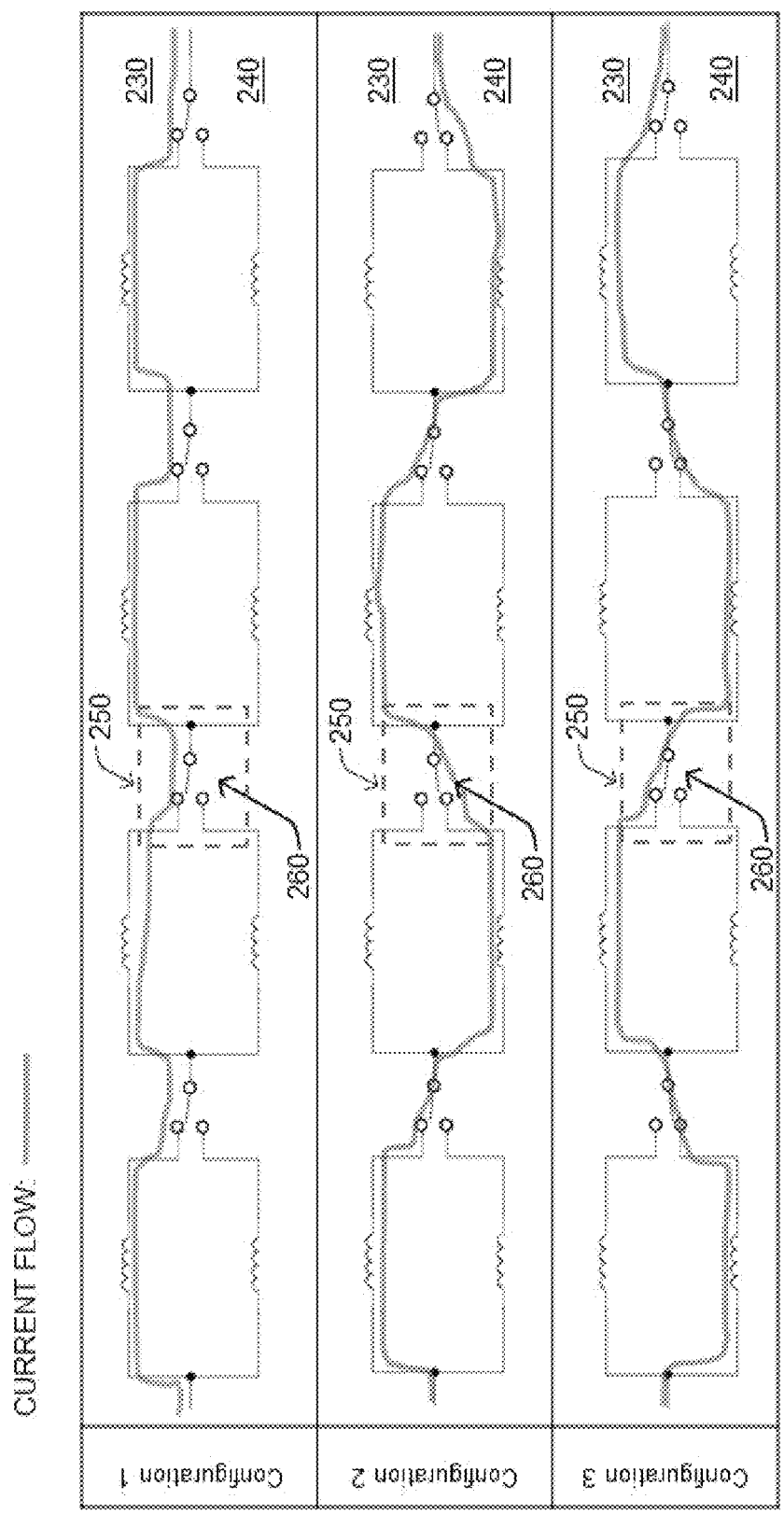
FIG. 12 illustrates example primary coil circuit diagrams corresponding to a plurality of current flow configurations for achieving varying magnetic flux angles.

FIG. 12 illustrates example primary coil circuit diagrams corresponding to a plurality of current flow configurations for achieving varying magnetic flux angles. As shown in FIG. 12, the depicted primary coil circuit diagrams correspond to the current flow configurations depicted in FIG. 8. In particular, the state of each switching element 260, which in this instance is a single-pole double-throw (SPDT) switch, can be set to route the electric current through specific portions of the top coil 230 and the bottom coil 240. Each inductor symbol in the circuit represents a half-turn of coil, and one cross-coil junction unit 250 may be disposed between the top and bottom coils for every half-turn.

The first current flow configuration ("Configuration 1") consists of electric current flowing through the top coil 230 only and thus produces a vertical magnetic flux 110, such as that shown in FIG. 1. The switching elements 260 may be set to pass current through the top coil 230 only by default. Thus, if the vehicle 210 parks in the proper charging position, where the primary coil 220 is aligned with the secondary coil 320, the controller need not make any adjustments to the switching elements 260. On the other hand, the remaining two current flow configurations ("Configuration 2" and "Configuration 3") consist of electric current flowing through sections of both the top coil 230 and the bottom coil 240 according to the states of the switching elements and thus produce an angled magnetic flux 110 having an angular offset from the vertical axis 120 extending from the primary coil 220. As noted above, according to Equation 1, the angular offset ($\phi$) of the magnetic flux 110 increases as the distance z between the top and bottom coils increases and decreases as the average radius R of the top and bottom coils increases. Of course, the circuit diagrams corresponding to each current flow configuration shown in FIG. 12 are for demonstration purposes only and should not be treated as limiting the scope of the present disclosure as such.

Figure 13:
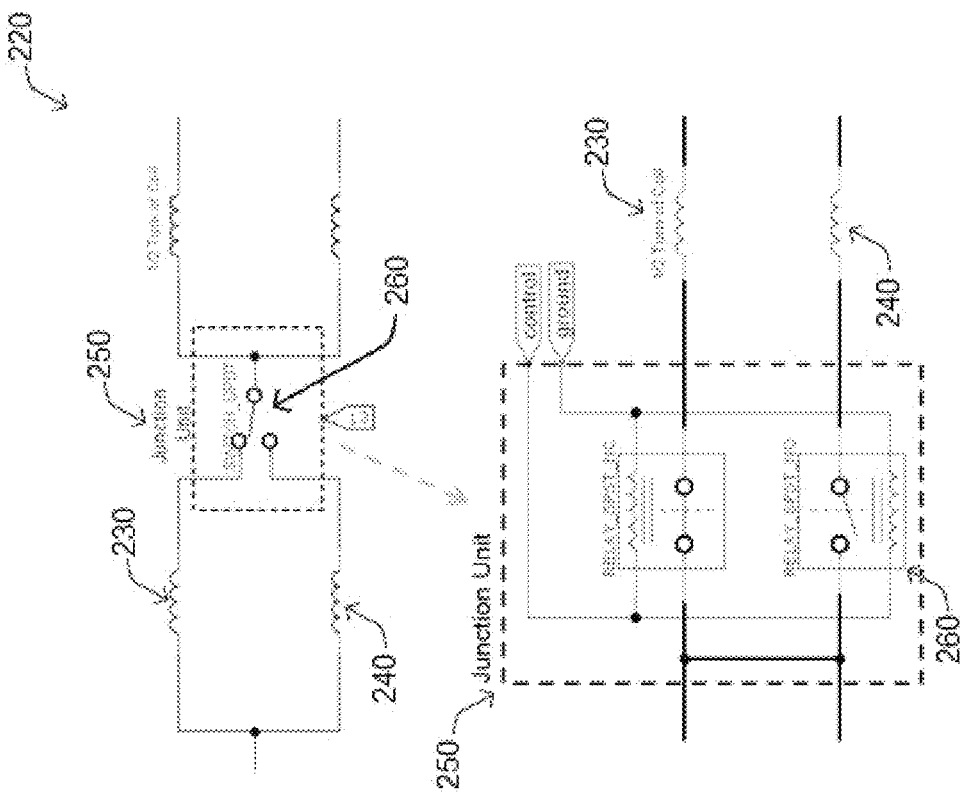
FIG. 13 illustrates an example circuit diagram of the primary coil with an alternative switching element design.

FIG. 13 illustrates an example circuit diagram of the primary coil with an alternative switching element design. As shown in FIG. 13, the primary coil 220 includes a top coil 230 and a bottom coil 240 with a cross-coil junction unit 250 disposed therebetween. There may be one cross-coil junction unit 250 for every half turn of coil. Also, each cross-coil junction unit 250 may include a switching element 260 for routing electric current through specific portions of the primary coil 220. The wireless charging controller can control the switching elements 260 using a control signal (e.g., c1 or c2). As explained above, the switching element 260 may be variously realized. For instance, the switching element 260 may include an SPDT switch, as shown in FIGS. 11 and 12.

Further, the bottom portion of FIG. 13 illustrates another possible circuit for the cross-coil junction unit 250 to control current flow between the top coil 230 and bottom coil 240. Dual electromechanical relays may be utilized as the switching element 260, where the top relay is normally closed, allowing current to pass through the top coil 230, and the bottom relay is normally open. This way, there will be no efficiency loss when a directly vertical magnetic flux ($\phi=0$) is desired since the relays can be left in the default state. On the other hand, when the control signal goes high, it may open the top relay and close the bottom relay, effectively switching the current path to the bottom coil 240.

Because two cross-coil junction units 250 may be required for every one turn of the primary 220, the total number of relays necessary can be calculated as: $R=4*N$, where R is the number of relays, and N is the number of turns of coil. Current can pass through only one relay in each cross-coil junction unit 250, and therefore, the current flowing through the primary coil 220 may pass through only half of the total relays. Notably, while solid state switches typically have a longer life expectancy and are less prone to failure by physical shock, electromechanical relays have significantly better conductance in the on-state, and better insulation in the off-state. Thus, the circuit design of the cross-coil junction units 250 can be chosen based on the particular application.

Figure 14:
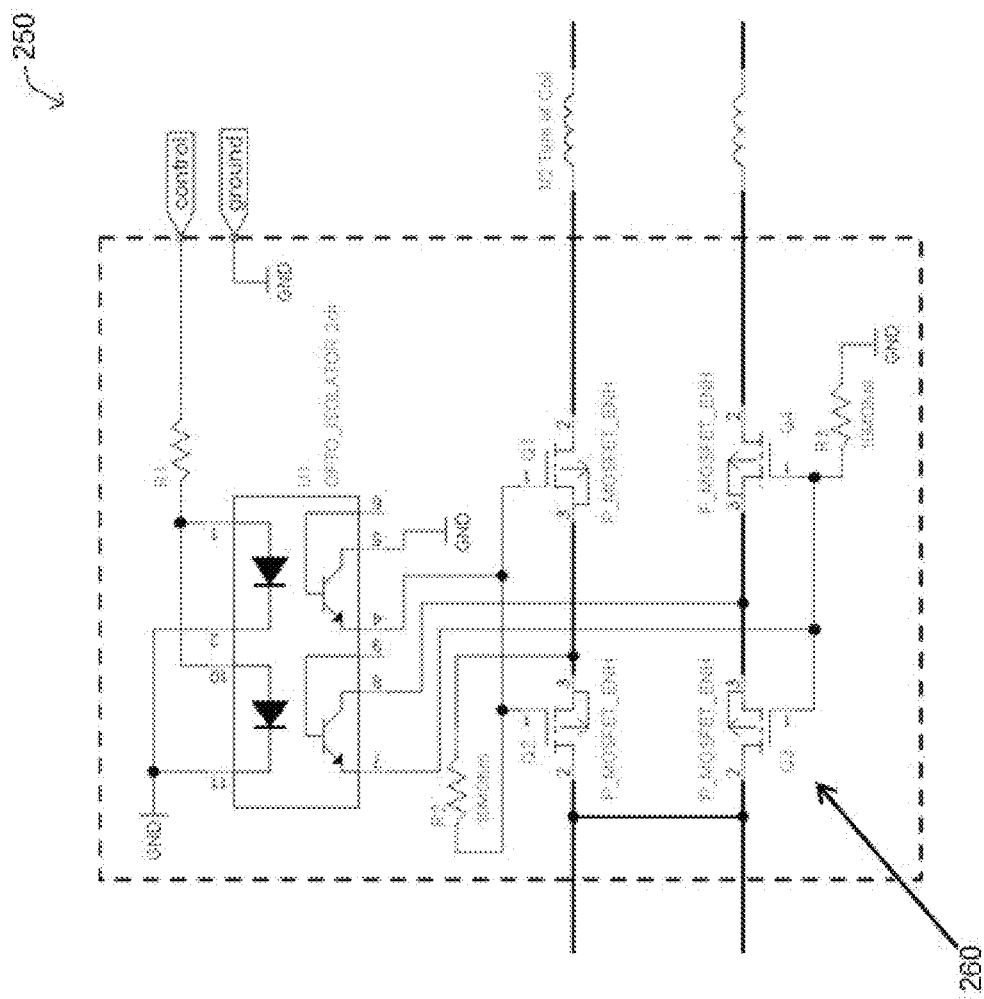
FIG. 14 illustrates an example circuit diagram of a cross-coil junction unit with an alternate switching element design.

FIG. 14 illustrates an example circuit diagram of a cross-coil junction unit with an alternate switching element design. As shown in FIG. 14, the cross-coil junction unit 250 can include an opto-isolator for driving the gate voltage based on input from the control signal. The voltage at the source nodes (node 3 in FIG. 14) is expected to always be above the ground reference.

Further, the switching element 260 included in the cross-coil junction unit 250 may include a group of four metal-oxide-semiconductor field-effect transistors (MOSFETs). The group of four MOSFETs, as shown in FIG. 14, may be used as the switching element 260, as an alternative to switches or relays, for routing electric current through specific portions of the primary coil 220. One pair of the MOSFETs can act as a single SPST switch. In this design, because four MOSFETs are required per cross-coil junction unit 250, the total number of MOSFETs necessary can be described as: F=8*N, where F is the number of MOSFETs, and N is the number of turns of coil. Similar to the design of the relays, current can pass through only two MOSFETs in each cross-coil junction unit 250, and therefore, the current flowing through the primary coil 220 may pass through only half of the total MOSFETs.

As shown in FIGS. 5A and 5B, the plurality of cross-coil junction units 250 may be disposed along one row or line traversing a diameter of the top coil 230 and the bottom coil 240. However, the arrangement of the cross-coil junction units 250 are not limited to a single row traversing a diameter of the top coil 230 and the bottom coil 240. In this regard, FIG. 15 illustrates an example simplified top view of the primary coil and an alternate arrangement of cross-coil junction units. As shown in FIG. 15, the primary coil 220 may include multiple rows of cross-coil junction units 250. That is, the cross-coil junction units 250 may be disposed along multiple lines traversing a diameter of the top coil 230 and the bottom coil 240.

In the configuration of cross-coil junction units 250 shown in FIG. 15, each line of cross-coil junction units 250 is angularly offset from an adjacent line of cross-coil junction units 250 by 45 degrees. However, the arrangement of cross-coil junction units 250, including the number of rows of cross-coil junction units 250, the spacing of adjacent cross-coil junction units 250, and so forth, can vary according to the particular application. By varying the number of rows of cross-coil junction units 250 in the primary coil 220 and/or varying the spacing of adjacent cross-coil junction units 250 in the primary coil 220, it is possible to produce a magnetic flux 110 that is directed in various dimensions.

FIGS. 16A-16I illustrate example simplified top views of a primary coil having multiple rows of cross-coil junction units in varying degrees of misalignment with a secondary coil. As shown in FIGS. 16A-16I, the primary coil 220 may include multiple rows of cross-coil junction units 250, where each row of cross-coil junction units 250 is angularly offset from an adjacent row of cross-coil junction units 250 by 45 degrees, mirroring the arrangement shown in FIG. 15. In FIGS. 16A-16I, the lightly shaded area of the primary coil 220 indicates that electric current is flowing through the bottom coil 240, and the darkly shaded area of the primary coil 220 indicates the electric current is flowing through the top coil 230.

While a primary coil 220 having a single row of cross-coil junction units 250 traversing the diameter of the primary coil 220 is capable of at least three distinct current flow configurations, e.g., as demonstrated in FIGS. 8 and 12, the primary coil 220 including multiple rows of cross-coil junction units 250 traversing the diameter of the primary coil 220 at an angular offset from each adjacent row of 45 degrees may be capable of at least nine distinct current flow configurations, as demonstrated in FIGS. 16A-16I. To this point, the switching elements 260 included in the cross-coil junctions 250 shown in FIGS. 16A-16I can be controlled so as to route current through specific sections of the top coil 230 and bottom coil 240 to produce an optimal angle of magnetic flux 110 to wirelessly charge the vehicle 210, based on the misalignment, if any, between the primary coil 220 and the secondary coil 320.

For instance, following the top-down perspective adopted in FIGS. 16A-16I, if the secondary coil 320 is positioned forward and left of the primary coil 220 (see FIG. 16A), the controller can set the switching elements 260 such that electric current flowing through the primary coil 220 (i.e., the top coil 230 and bottom coil 240) produces a magnetic flux 110 that is angled toward the secondary coil 320 (i.e., forward and left of the primary coil 220). Further, if the secondary coil 320 is positioned forward of the primary coil 220 (see FIG. 16B), the controller can set the switching elements 260 such that electric current flowing through the primary coil 220 produces a magnetic flux 110 that is angled toward the secondary coil 320 (i.e., forward of the primary coil 220). Further, if the secondary coil 320 is positioned forward and right of the primary coil 220 (see FIG. 16C), the controller can set the switching elements 260 such that electric current flowing through the primary coil 220 produces a magnetic flux 110 that is angled toward the secondary coil 320 (i.e., forward and right of the primary coil 220). This same concept is repeated throughout FIGS. 16D-16I, whereby the direction of the magnetic flux 110 can be optimally adjusted to compensate for several types of misalignment between the primary and secondary coils. It should be apparent that little to no misalignment is present in FIG. 16E, and thus, the switching elements 260 can remain in their default state to route current through the top coil 230 only, producing a vertical magnetic flux 110.

Figure 17B:
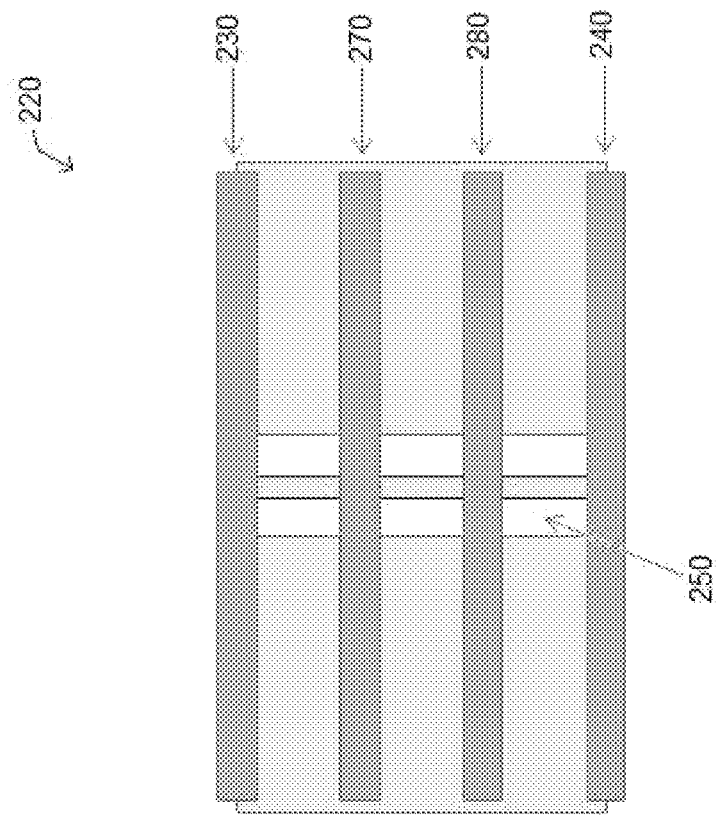
FIGS. 17A and 17B illustrates example simplified views of an alternate arrangement of the primary coil and an alternate arrangement of cross-coil junction units.
Figure 17A:
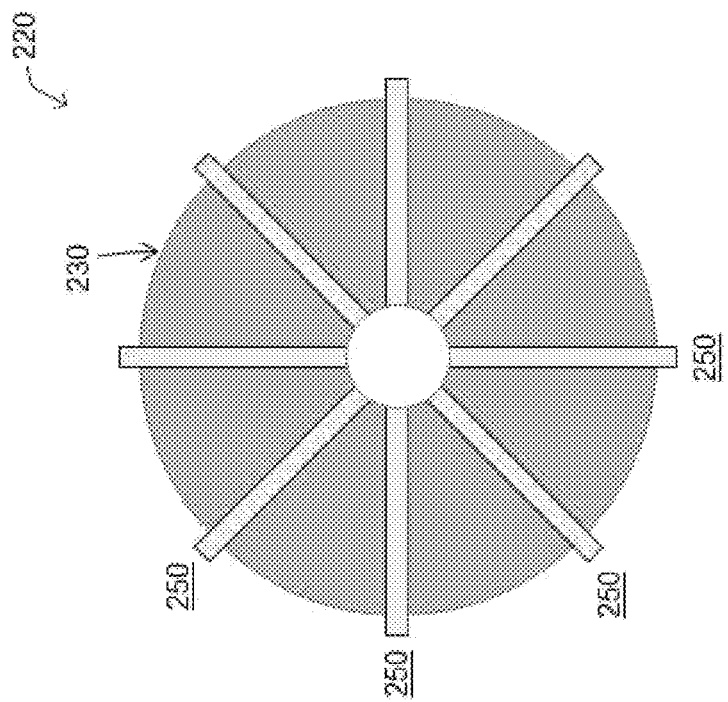

In addition, FIGS. 17A and 17B illustrates example simplified views of an alternate arrangement of the primary coil and an alternate arrangement of cross-coil junction units. As shown in the top view of FIG. 17A, the primary coil 220 may include multiple rows of cross-coil junction units 250 traversing a diameter of the top coil 230 and the bottom coil 240, similar to the arrangement depicted in FIG. 15, whereby each line of cross-coil junction units 250 is angularly offset from an adjacent line of cross-coil junction units 250 by 45 degrees.

As shown in the side view of FIG. 17B, the primary coil 220 may include layers of coils in addition to the top coil 230 and bottom coil 240 described in detail hereinabove. For instance, the primary coil 220 may also include a first intermediate coil 270 and a second intermediate coil 280 sandwiched between the top coil 230 and the bottom coil 240. The cross-coil junction units 250 may be disposed between each layer of coil included in the primary coil 220, and the switching elements 260 included in the cross-coil junction units 260 can route electric current through at least a portion of one or more of the top coil 230, the bottom coil 240, the first intermediate coil 270, and the second intermediate coil 280. As a result, additional current flow configurations may be possible, thereby allowing for the capability to finely tune the angle of magnetic flux 110 to compensate for a wide range of misalignment between the primary coil 220 and secondary coil 320. As explained above, the primary coil arrangement shown in FIGS. 17A and 17B is merely for demonstration purposes and does not limit the scope of the present disclosure or claims. Additional layers of coil and/or rows of cross-coil junction units may be added or removed to the primary coil, in accordance with the preferences of its designer.

Figure 18:
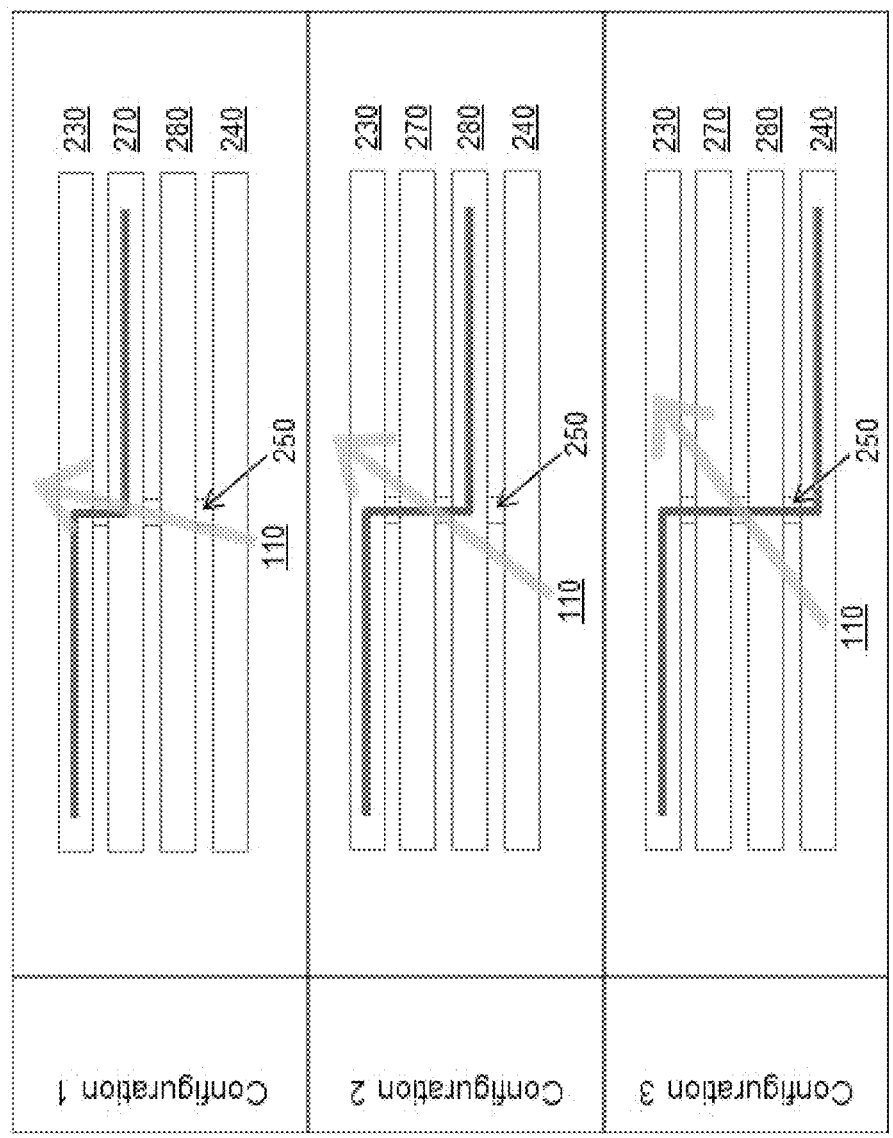
FIG. 18 illustrates additional example current flow configurations for achieving varying magnetic flux angles.

FIG. 18 illustrates additional example current flow configurations for achieving varying magnetic flux angles. Particularly, FIG. 18 shows three possible current flow configurations among at least 25 current flow configurations, which result from the arrangement of the cross-coil junction units 250—shown in FIG. 17A—and the number of coil layers in the primary coil 220, which in this case equals four—shown in FIG. 17B. The solid line drawn through portions of the top coil 230, first intermediate coil 270, second intermediate coil 280, and/or bottom coil 240 indicates a flow of electric current. It should be apparent that utilizing four layers of coil in the primary coil 220 creates three possible z-gaps. The most effective z-gap can be chosen to produce variable angles for the most optimal magnetic flux direction.

In the first example current flow configuration ("Configuration 1"), electric current flows through a section of the top coil 230 and a section of the first intermediate coil 270. This flow configuration results in a magnetic flux 110 angle that is slightly offset to the right of the vertical axis 120, which can achieve maximum charging efficiency when the primary and secondary coils are slightly misaligned. In the second example current flow configuration ("Configuration 2"), electric current flows through a section of the top coil 230 and a section of the second intermediate coil 280. This flow configuration results in a magnetic flux 110 angle that is further offset to the right of the vertical axis 120, which can achieve maximum charging efficiency when the primary and secondary coils are moderately misaligned. In the third example current flow configuration ("Configuration 3"), electric current flows through a section of the top coil 230 and a section of the bottom coil 240. This flow configuration results in a magnetic flux 110 angle that is even further offset to the right of the vertical axis 120, which can achieve maximum charging efficiency when the primary and secondary coils are severely misaligned.

Accordingly, techniques are described herein that provide for utilizing a power transmitter coil assembly including multiple parallel coils with electrical switching elements disposed between them. The switching elements can be controlled to guide electric current through specific parts of the coils and effectively create different current flow configurations. Each current flow configuration produces a unique angle of magnetic flux. Therefore, the efficiency of wireless charging systems can be improved by adjusting the magnetic flux angle to optimally couple with a power receiving coil installed in the vehicle to be charged. Further, adjustment of the magnetic flux angle can be achieved without any physically moving parts, along with greater misalignment tolerance and the capability to charge a vehicle over a larger span of distance result.

While there have been shown and described illustrative embodiments that provide for an interoperable electric vehicle wireless charging method and system, it is to be understood that various other adaptations and modifications may be made within the spirit and scope of the embodiments herein. For example, the embodiments have been primarily shown and described herein with relation to a primary coil with multiple layers of parallel coils. However, the embodiments in their broader sense are not as limited, as the same concepts as described herein could alternatively or additionally be applied to the receiving (i.e., secondary) coil. Further, while the embodiments have been primarily shown and described herein with relation to wireless vehicular charging, the embodiments in their broader sense are not as limited, as the same concepts as described herein could alternatively be applied to wireless charging of non-vehicular devices. Accordingly, the disclosed embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting that a wireless charging-capable vehicle is in a charging position proximate a primary coil of a wireless charging system that is operable to wirelessly charge the vehicle via a secondary coil installed in the vehicle,
   wherein the primary coil includes a top coil and a bottom coil that are substantially parallel to one another, the top coil and the bottom coil coupled to one another via a plurality of cross-coil junction units each including a switching element that routes electric current through at least a portion of one or more of the top coil and the bottom coil;
   setting the switching elements such that current flowing through the primary coil produces an optimal angle of magnetic flux for wirelessly charging the vehicle given a position of the primary coil with respect to a position of the secondary coil; and
   causing electric current to flow through the primary coil according to the set switching elements to wirelessly charge the vehicle.

2. The method of claim 1, further comprising:
   cycling through a plurality of current flow configurations in the primary coil by adjusting states of the switching elements;
   determining which current flow configuration of the plurality of current flow configurations produces the optimal angle of magnetic flux for wirelessly charging the vehicle; and
   setting the switching elements according to the determined current flow configuration.

3. The method of claim 2, further comprising:
   receiving charging efficiency data from the vehicle during the cycling through of the plurality of current flow configurations; and
   determining which current flow configuration of the plurality of current flow configurations produces the optimal angle of magnetic flux for wirelessly charging the vehicle based on the charging efficiency data.

4. The method of claim 2, further comprising:
   causing low-power electric current to flow through the primary coil during the cycling through of the plurality of current flow configurations; and
   causing full-power electric current to flow through the primary coil after the setting of the switching elements according to the determined current flow configuration to wirelessly charge the vehicle.

5. The method of claim 2, wherein each current flow configuration of the plurality of current flow configurations produces a unique angle of magnetic flux for wirelessly charging the vehicle.

6. The method of claim 1, wherein the optimal angle of magnetic flux for wirelessly charging the vehicle is an angle offset from a vertical axis extending upwardly from the primary coil when the vehicle is positioned such that the secondary coil is misaligned with the primary coil.

7. The method of claim 1, wherein the current flowing through the primary coil produces an angle of magnetic flux for wirelessly charging the vehicle that is proportional to a ratio of z/R, where z is a vertical distance between the top coil and the bottom coil, and R is an average coil radius of the primary coil.

8. The method of claim 1, wherein the plurality of cross-coil junction units are disposed between the top coil and the bottom coil.

9. The method of claim 1, wherein one end of each cross-coil junction unit is connected to the top coil, and another end of each cross-coil junction unit is connected to the bottom coil.

10. The method of claim 1, wherein the plurality of cross-coil junction units are disposed along one line traversing a diameter of the top coil and the bottom coil.

11. The method of claim 1, wherein the plurality of cross-coil junction units are disposed along multiple lines traversing a diameter of the top coil and the bottom coil.

12. The method of claim 11, wherein each line of cross-coil junction units is angularly offset from an adjacent line of cross-coil junction units by 45 degrees.

13. The method of claim 1, wherein two cross-coil junction units are disposed in the primary coil for every full turn of the top coil or the bottom coil.

14. The method of claim 13, further comprising:
controlling the switching element of a first cross-coil junction unit of the two cross-coil junction units using a first control signal; and
controlling the switching element of a second cross-coil junction unit of the two cross-coil junction units using a second control signal.

15. The method of claim 1, wherein the electric current flows through the top coil only when the switching elements are in a default state, thus producing an angle of magnetic flux for wirelessly charging the vehicle that is parallel to a vertical axis extending upwardly from the primary coil.

16. The method of claim 1, wherein:
the primary coil further includes a first intermediate coil and a second intermediate coil that are disposed between the top coil and the bottom coil and substantially parallel to the top coil and the bottom coil, and
the switching elements included in the plurality of cross-coil junction units route electric current through at least a portion of one or more of the top coil, the bottom coil, the first intermediate coil, and the second intermediate coil.

17. The method of claim 1, wherein each switching element includes a single-pole double-throw (SPDT) switch.

18. The method of claim 1, wherein each switching element includes dual relays.

19. The method of claim 1, wherein each switching element includes a group of four metal-oxide-semiconductor field-effect transistors (MOSFETs).

20. A wireless charging system comprising:
a primary coil that is operable to wirelessly charge a wireless charging-capable vehicle via a secondary coil installed in the vehicle, the primary coil including a top coil and a bottom coil that are substantially parallel to one another, the top coil and the bottom coil coupled to one another via a plurality of cross-coil junction units each including a switching element that routes electric current through at least a portion of one or more of the top coil and the bottom coil;
a circuit that drives the primary coil and causes electric current to flow through the primary coil; and
a wireless charging controller configured to:
detect that the vehicle is in a charging position proximate the primary coil,
set the switching elements such that current flowing through the primary coil produces an optimal angle of magnetic flux for wirelessly charging the vehicle given a position of the primary coil with respect to a position of the secondary coil, and
control the circuit such that electric current is caused to flow through the primary coil according to the set switching elements to wirelessly charge the vehicle.

* * * * *